James W. Henry
Nevil Davy
INVENTORS

United States Patent Office 3,547,518
Patented Dec. 15, 1970

3,547,518
REINFORCED PLASTIC SCREENS
James W. Henry and Nevil Davy, Kingsport, Tenn., assignors to Eastman Kodak Company, Rochester, N.Y., a corporation of New Jersey
Continuation-in-part of application Ser. No. 250,667, Jan. 10, 1963. This application Sept. 12, 1966, Ser. No. 587,632
Int. Cl. G03b 21/56
U.S. Cl. 350—117                    3 Claims

ABSTRACT OF THE DISCLOSURE

A reinforced lenticulated homogeneous plastic sheet in which the reinforcing members are positioned in register with the lenticule intersections in such manner as to conceal them from view.

---

This is a continuation-in-part of our U.S. patent application, Ser. No. 250,667, filed Jan. 10, 1963, now abandoned.

This invention relates to plastic sheet, and more particularly to reinforced plastic sheet.

It is frequently desirable to reinforce clear thermoplastic sheet to prevent physical distortion. For example, when such sheet is employed outdoors as a viewing screen for advertising signs or in glazing applications, wind acting against the sheet is apt to deform it. Although it is known that plastic articles may be reinforced with metallic members, such reinforcements have been regarded as unsatisfactory for clear plastic since it would interfere with the subject matter being viewed through the sheet.

One object of our invention is to provide reinforced clear plastic sheet. Another object of our invention is to provide invisible reinforcement for lenticular plastic screens, and a further object is to provide a sheet with essentially one way visibility. Other objects of our invention will appear herein.

We have found that clear thermoplastic sheeting having a plurality of adjacent, parallel longitudinal lenticular lenses may be reinforced by embedding in the sheet a plurality of metallic reinforcement members in register with the intersections of the lenticular lenses. This reinforcement in accordance with our invention is not visible to the average viewer when the sheet is seen from a distance such that the arc subtended at the eye of the viewer is less than 15 minutes of arc.

Our invention will be further illustrated in the accompanying drawings which show various clear thermoplastic lenticular sheets and different types of reinforcing members which may be employed in accordance with the invention.

Figure 1:
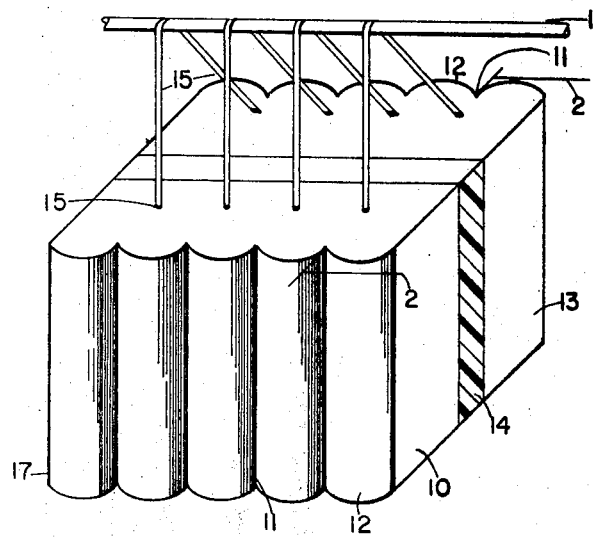
Figure 2:
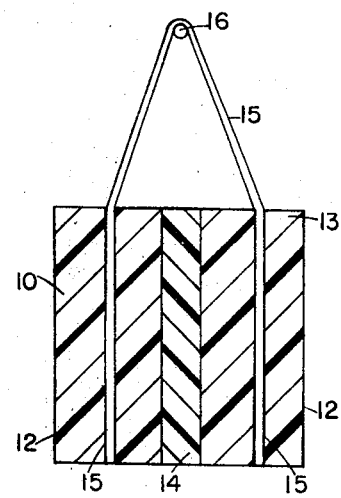
Figure 3:
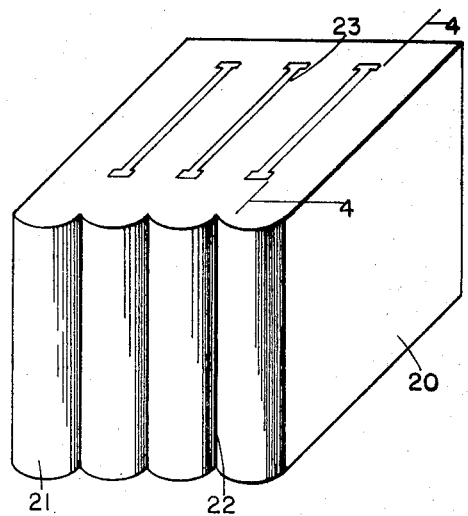
Figure 4:
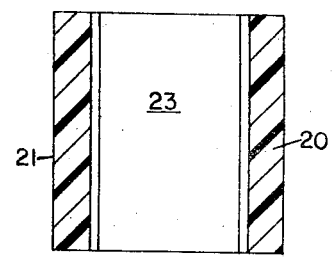

FIG. 1 illustrates a typical reinforced lenticular screen in accordance with the invention, and FIG. 2 is a view in section of FIG. 1. FIG. 3 shows a variation of the invention using thin flat metallic reinforcing elements, and FIG. 4 is a view in section of FIG. 3.

In FIG. 1, a flat frosted diffusing screen 14 has disposed on either side thereof clear (i.e. transparent homogeneous plastic sheets 10 and 13 each of which are provided with a plurality of lenticular lenses 12 having intersections 11 formed therebetween. The plastic sheets have metallic wire reinforcing members 15 embedded therein as clearly shown in FIG. 2, which wire members are in register with the intersections 11 of the lenticules 12. The wire reinforcing members 15 as shown may be extended to a support 16 or may terminate adjacent the sheet edge. The embedded wires 15 maintain flatness of the plastic screen 17 by supporting the clear plastic sheets 10 and 13 in vertical tension. The reinforcing members 15, as mentioned serve only to rigidify the overall plastic structure, and do not provide any interlocking between lenses. In FIG. 3, a clear plastic sheet 20 is provided with a plurality of lenticular lenses 21 forming intersections 22 therebetween. Thin, flat metallic reinforcing elements 23 are embedded in the plastic sheet in register with the intersections 22 of the lenticular lenses 21. The reinforcing elements 23 may be provided with fastening means, not shown, to support the entire plastic sheet 20 in a suitable position. And, of course, the wire reinforcing members 15 as shown in FIGS. 1 and 2 may also be used instead of the elements 23 if desired. It can further be noted from FIG. 3 that upon looking through the sheet from the lensside the reinforcement will be invisible, but when viewing in the opposite direction, from the planar side, the reinforcement will be visible, and because of the close spacing, will essentially destroy the visibility therethrough. This, in effect, then provides a sheet with one-way visibility. It may also be desirable to provide a lens system on both sides of a sheet such as 20, thereby providing a sheet which hides the reinforcement in both viewing directions.

The lenticular lens grid as shown at 12 and 21 may be formed either by embossing or during the sheet extrusion and preferably will contain between 10 and 100 lenses per inch.

Reinforcing members which we employ in our invention may advantageously be wires or rods, of relatively thin diameter, or they may be thin strips of metal. It is preferable that the reinforcing members have a thickness of approximately ⅕ the width of the lenses and be in a range of between 4 and 25 mils. If this relationship is maintained, the reinforcing members are invisible when viewed from a normal viewing distance, and sheet rigidity is much improved. The metallic reinforcing elements may be embedded in the plastic sheet in any suitable manner and may be prestressed if desired. For example, we have found that it is advantageous to extrude the plastic material over the reinforcing members in the formation of the sheet or to hot press sheets together thereby embedding the reinforcing members.

The sheets may be formed of any suitable plastic, cellulose acetate butyrate being particularly advantageous, and should generally range between 50 and 125 mils in thickness although the invention is not so limited. Other typical thermoplastic materials include polyvinyl acetate, polyvinyl chloride, polystyrene, methylmethacrylate, copolymers of ethylacrylate and methylmethacrylate and ethylacrylate or acrylonitrile. Although it is usually preferable that the plastics be clear, in certain instances it may be desirable to tint the sheet.

The lenticular grid configuration of the sheet in accordance with our invention is, as well known in the art, suitable for providing stereoscopic effects, or for viewing two-dimensional pictures or messages.

The screens of the invention may be employed by projecting a scene through the sheet and viewing the image through the lenticular lens side. Stereoscopic effects may be obtained by projecting two or more slides upon a screen of the type described in FIG. 1, and viewing the image from the opposite side of the screen. Also, stereoscopic effects may be obtained by placing a stereoscopic print on the back of a screen of the type shown in FIG. 3, furnishing a light in back of the print, and viewing the print through the reinforced lenticular screen. Or such sheet may be used as a replacement for window glass where either one-way viewing is desired or where plastic can offer safety and/or economic advantages.

The invention has been described in detail with particular reference to preferred embodiments thereof but it will be understood that variations and modifications can be effected within the spirit and scope of the in-

We claim:

1. A reinforced plastic sheet comprising a substantially homogeneous transparent plastic screen including upon at least one surface a plurality of substantially parallel intersecting lenticular lenses having intersections therebetween, and a plurality of reinforcing members embedded in said screen each reinforcing member being substantially in register with an intersection to provide rigidifying support for the screen.

2. A reinforced plastic sheet according to claim 1 wherein said one surface includes at least 10 lenticular lenses per inch and the width of said reinforcing members is approximately one-fifth that of one of said lenses.

3. A reinforced plastic sheet according to claim 1 and further comprising a second substantially homogeneous transparent plastic screen constructed the same as the first mentioned substantially homogeneous transparent plastic screen, and a frosted diffusing screen positioned between and contiguous to each of said transparent plastic screens, the reinforcing members and intersections of each screen being substantially in register with those of the other screen.

References Cited

UNITED STATES PATENTS

| | | | |
|---|---|---|---|
| 773,174 | 10/1904 | Wadsworth | 350—263X |
| 1,883,290 | 10/1932 | Ives | 350—117UX |
| 1,943,995 | 1/1934 | Weld | 350—260 |
| 2,131,974 | 10/1938 | Saint Genies | 350—128 |

FOREIGN PATENTS

| | | | |
|---|---|---|---|
| 639,193 | 3/1928 | France | 352—58 |
| 956,825 | 4/1949 | France | 352—61 |

JOHN M. HORAN, Primary Examiner

M. H. HAYES, Assistant Examiner

U.S. Cl. X.R.

350—128, 129, 167, 259; 352—58, 61